United States Patent
Manoogian et al.

[15] 3,674,048
[45] July 4, 1972

[54] MIXING VALVE

[72] Inventors: Alex Manoogian, Grosse Pointe Farms; Eric V. Pullen, Northville, both of Mich.

[73] Assignee: Masco Corporation, Taylor, Mich.

[22] Filed: April 9, 1970

[21] Appl. No.: 132,703

[52] U.S. Cl. ..................... 137/270, 137/625.41, 251/288
[51] Int. Cl. .................................................... F16k 11/08
[58] Field of Search ............... 137/625.41, 270, 625.40; 251/288

[56] References Cited

UNITED STATES PATENTS 3,437,273   4/1969   Hagfors.......................137/625.41 X Primary Examiner—M. Cary Nelson
Assistant Examiner—Robert J. Miller
Attorney—Whittemore, Hulbert & Belknap

[57] ABSTRACT

A hot and cold water mixing valve having hot and cold water inlet ports controlled by a rotatable valve member to open and close the inlet ports in sequence suitable for use of the valve as a shower valve or the like. An adjustable stop associated with the valve permits the full hot position to be adjusted to prevent scalding. In installations such as apartments, hotels or the like wherein a single system of hot and cold water supply pipes services shower or tub facilities arranged back to back on opposite sides of a common wall containing the supply pipes, a fixed bushing part may be selectively oriented relative to the inlet ports so that in both such installations the valve is rotatable in the same direction of rotation and provides the proper sequence of operation without the necessity of additional cross over piping within the wall.

10 Claims, 7 Drawing Figures

INVENTORS.
Alex Manoogian
Eric V. Pullen
BY Whittemore, Hulbert
 & Belknap

ATTORNEYS.

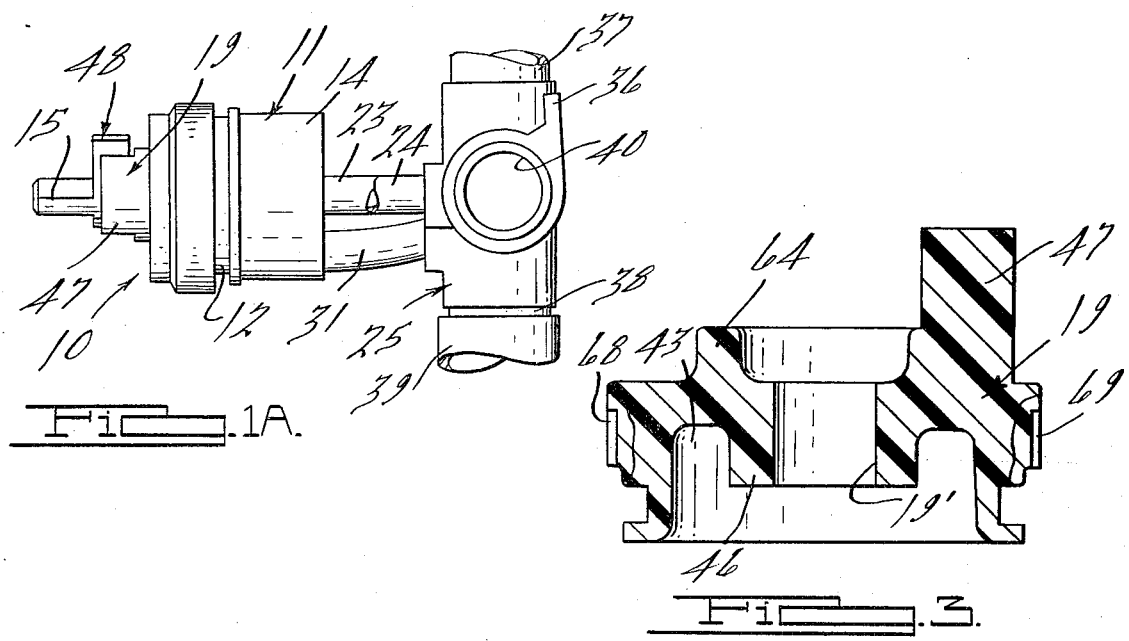
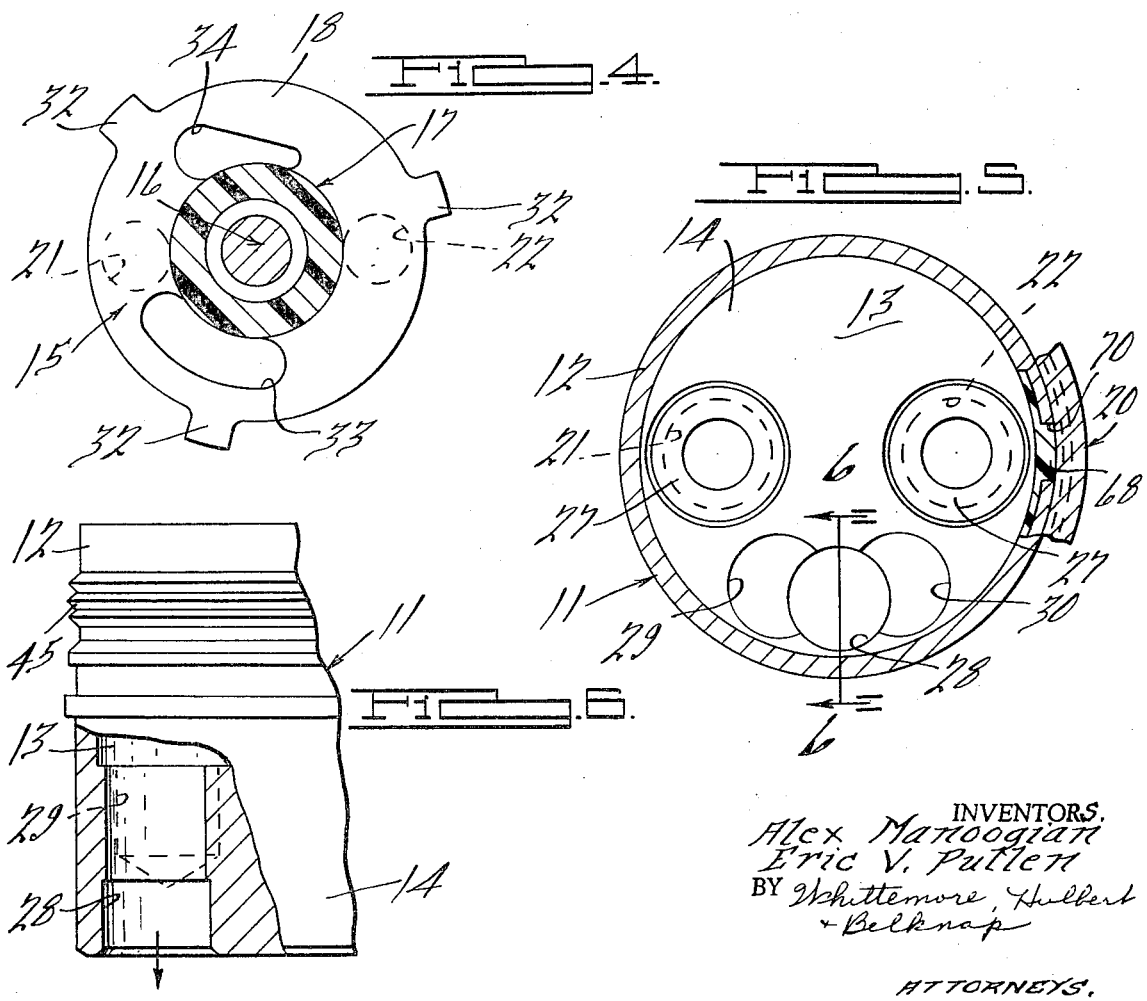

3,674,048

MIXING VALVE

SUMMARY OF THE INVENTION

The valve incorporates a specially shaped motion limiting control element connected to the shank of a rotatable valve stem carrying a valve disc which has hot and cold water ports therein and through which ports the hot and cold water passes for mixing in a mixing chamber. The valve stem and control element are rotatable as a unit, and the control element may be assembled to the shank in but a single angular and axial relation to the latter. It is therefore impossible to set the control element improperly in reference to the hot and cold water ports of the valve disc. Further pursuant to the invention, the control element referred to is provided with radially extending stop arms, one of which limits the rotation of the element in one direction by abutting one surface of a fixed extension of a bushing component of the valve structure. This is when the valve is in its closed position. The other of the radial arms, upon rotation of the valve stem in an opposite direction, engages an opposite surface of the same extension part of the valve bushing. This is when the valve is conditioned for a maximum flow of water to the mixing chamber from the hot water line, and this position is optionally adjustable at the time of installation or later through the agency of an adjustable set screw on the last-mentioned control element arm. Thus it is possible to set the valve to prevent the possibility of a scald or discomfort from the shower head flow.

Another improved feature of the invention resides in the provision of means enabling the bushing and valve stem components to be selectively set in diametrically opposite positions in the valve body, thus permitting the back-to-back orientation of two valve units fed by a single set of supply lines without the necessity of extraneous inter-wall piping which would otherwise be necessary to provide proper sequencing of the valves. The same direction of hand-rotation of both valves, counterclockwise or clockwise, produces the same sequence of operation at either space serviced by the interwall piping.

BRIEF DESCRIPTION OF THE DRAWINGS

FIG. 1A is a fragmentary side elevational view of the valve as ordinarily positioned in use;

FIG. 3 is a fragmentary view in section similar to FIG. 1 of the valve stem bushing, better illustrating lug means by which its optional 180° reversible placement in the valve body is made possible;

FIG. 4 is a view of the rotatable valve stem in section on a line corresponding to the line 4—4 of FIG. 1, but showing the closed position of the valve member relative to the inlet ports;

FIG. 5 is a view in section on line 5—5 of FIG. 1, illustrating port provisions in the valve body, including hot and cold water intake passages to the valve member and mixing chamber, and the discharge passage leading to a shower head or a tub faucet; and FIG. 6 is a fragmentary view, partially broken away and sectioned on line 6—6 of FIG. 5, further illustrating the discharge passage.

DESCRIPTION OF A PREFERRED EMBODIMENT

Figure 1:
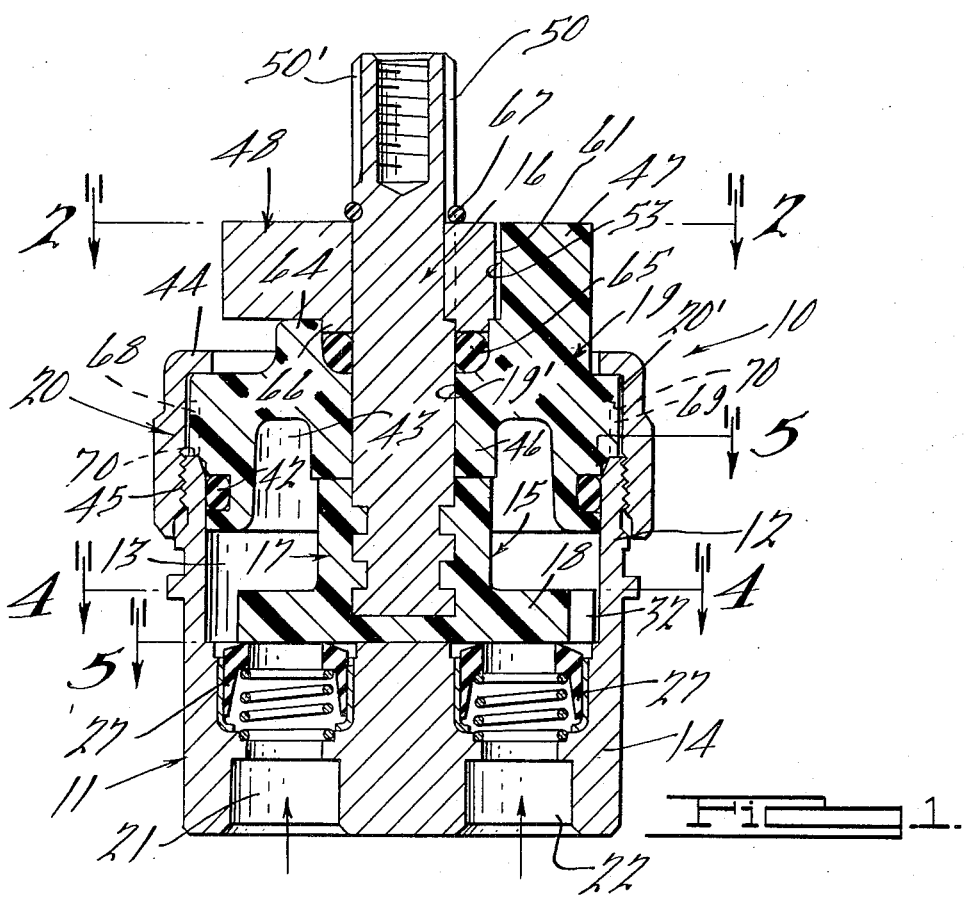
FIG. 1 is a view in enlarged scale cross section, being in a plane at 1—1 of FIG. 2 through the common axis of the assembly of body, stem, bushing and bonnet components of the improved mixing valve.

As illustrated in FIG. 1, the valve of the invention, generally designated by the reference number 10, comprises a fixed, internally machined and externally threaded brass body 11 of substantially continuous, generally cylindrical outline. One end portion thereof, as defined by a cylindrical wall 12, affords a mixing chamber 13 of substantial axial depth, the wall being an integral extension of a main body or base portion 14 ported for hot and cold water intake and mixed temperature discharge, in a manner hereinafter described.

A rotatable valve stem unit 15 is coaxially received in chamber 12, this unit including an elongated center operating shank 16 secured to the hub 17 of a disc-like valve element 18. The valve element 18 is preferably of a plastic composition and is molded onto the valve stem 16.

A fixed, generally cylindrical molded bushing 19, preferably also of a plastic composition, has a cylindrical hub bore 19' thereof telescoped onto a cylindrical part of stem shank 16, which is thus rotatively guided in bore 19'. A sleeve-like cylindrical metal bonnet 20 threaded onto body part 12 clamps a peripheral rib 20' of bushing 19 against the end surface of the valve body 11, while valve element 18 is freely rotatable over the ported surface of valve body portion 14.

As illustrated in FIGS. 1 and 5, the base portion is bored in the axial direction to afford cold and hot water intake ports 21, 22, respectively, which are spaced diametrically equal distances on opposite sides of the axis of the valve 10 as a whole. These ports are adapted respectively to have liquid-tight connection, as appears in FIG. 1A, with a cold water supply tube 23 and a hot water supply tube 24, which tubes are in turn communicated at a standard fitting 25 with corresponding lines of the inter-wall cold-hot water system of the building, in accordance with conventional plumbing practice.

The valve body ports 21, 22 communicate axially with valve seat spaces containing spring-urged rubber valve seat units 27 which sealingly engage the end surface of the valve disc member 18. Reference being had to FIGS. 5 and 6, the body portion 14 also has a single mixed water discharge passage 28 located in a plane half way between ports 21, 22 and at 90° to a line through the axes of these ports. Recesses 29 and 30 extend only partially into the body 14 (FIG. 6) and communicate in common between the valve mixing chamber 13 and the discharge passage 28. The flow of cold and hot water from the respective cold and hot lines 23, 24 and valve ports 21, 22, thence into the mixed water passage 28, is controlled by the valve disc 18 of the stem unit 16. As shown in FIG. 1A, a third copper tube 31 communicates the discharge passage 28 with an appropriate line in fitting 25 for a tempered water flow to the shower head or tub faucet.

Referring to FIG. 4 in conjunction with FIG. 1, the valve disc 18 carries three radially projecting ears 32 to locate it generally within the valve body wall 12, and it further is provided with an arcuate through-opening 33 of substantial area adapted to communicate cold water from the cold water inlet port 21 with mixing chamber 13. Another opening or throughpassage 34 in portion 18 of somewhat lesser area and tapering in width accommodates the flow to chamber 13 of hot water from intake port 22. The water flows from chamber 13 downwardly over the edges of valve 18 between ears 32 to the outlet 28.

The fitting 25 is cast to provide an integral flange formation at 36 for attaching it to a suitable wall or other support (not shown). Its body portion presents an upper leg to which a pipe 37 leading to the shower head has a liquid-tight connection, and a lower leg to which a pipe 38 leading to the tub faucet is similarly connected. These lines are of course fed by the water discharge tube 31, and an adapter pipe 39 is shown connected in the pipe line 38 to accommodate a conventional diverter (not shown) by which liquid flow is switched from tub faucet to shower head, and vice versa. One side port 40 of fitting 25 receives the hot water supply line of the system, communicating the latter with valve tube 24, and an opposite side port similarly establishes communication between the valve tube 23 and the cold water supply line.

The non-metallic bushing unit 19 (FIGS. 1, 2 and 3) is formed adjacent its inner end with an annular groove receiving an O-ring 42 for coaction with the inner cylindrical surface of the body wall 12 to provide a liquid-tight seal in this zone. Bushing 19 also has an annular inner recess at 43 enlarging the capacity of the mixing chamber 13 of the body wall 11. The outer axial end of bonnet member 20 is radially inwardly flanged at 44 to engage against the outer surface of bushing 19, and the bonnet 20 has an adjustable threaded connection at 45 with valve body 11, thus holding the bushing unit and stem unit 15 in proper assembly in the body 11, with proper axial force exerted on the hub 17 by an inner annular boss 46 of the bushing.

Figure 2:
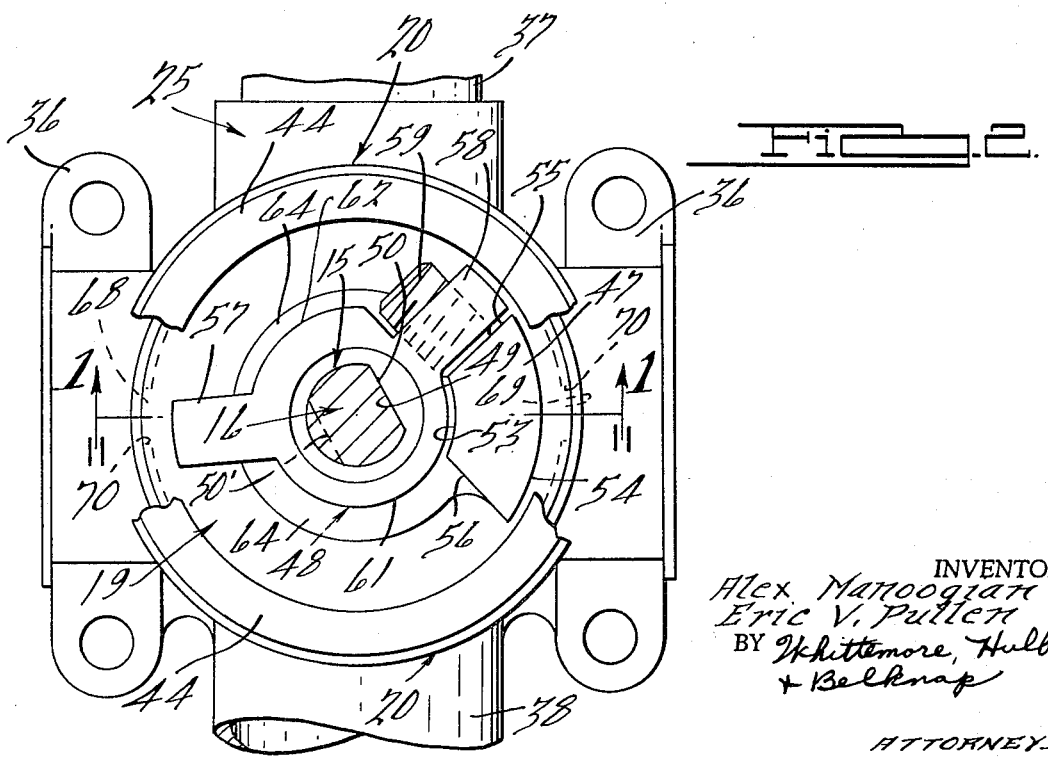
FIG. 2 is a view on line 2—2 of FIG. 1, showing the relationship of a motion-limiting control member in relation to a fixed stop extension of the valve's bushing, as when in a maximum hot water setting of the control member.

Referring to the end view of FIG. 2, in conjunction with the sectional views of FIGS. 1 and 3, the bushing 19 has an axially extending stop extension 47 thereon for coaction with a limit control member 48. This member is telescoped upon the shank 16 and has a D-shaped bore 49 with the flat side of this bore engaging the longer of two flats 50, 50' on the stem 16. This keys control member 48 for rotation with the valve stem 16 upon manual operation of a handpiece (not shown) screw-fastened to the end of stem 16 and engaging the flat 50'. Provision is made, in a manner to be described, to enable the placement of the control member element 48 on the shank 16 in only a single angular and axial orientation.

Thus, in performing its function the member 48 limits the angular swing of valve stem 16 between closed and maximum hot water discharge settings by its engagement with the integral stop extension 47 of bushing member 19. The stop 47 is defined in perimeter by an inner arcuate surface wall 53 of predetermined radius of curvature, a concentric outer wall surface 54 and opposite, angularly outwardly divergent side surfaces 55 and 56 predeterminedly spaced from one another, and predeterminedly located in relation to the cold and hot water ports 33, 34 of valve member 18.

The limit control member 48 is formed to provide an integral, radially extending stop arm 57 and, in predetermined angular spacing to that arm, a second radial stop arm 58 having a threaded bore receiving an adjusting set screw 59 to provide an adjustable stop engageable with the angular side surface 55 of the bushing extension 47, as illustrated in FIG. 2. This permits an adjustment of the position of valve disc 18 for a desired maximum exposure of its hot water port 34 to the hot water inlet port 22 of valve body portion 14. The arm 57, in directly engaging the surface 56 in the opposite direction, defines the closed position of the valve.

Further pursuant to the invention, one arcuate outer surface segment of the control element 48 at 61 has a radius which is but a trifle less than the curvature radius of the inner arcuate wall surface 53 of the bushing projection 47. This segment extends in a clockwise direction (FIG. 2) from the control member arm 58 to its other arm 57, permitting a swing of the element 48 in either angular direction through an arc greater than 90° in extent. However, the remaining arcuate portion 62 of control element 48 is of larger radius than both its other arcuate portion 61 and the inner arcuate surface 53 of the bushing extension 47. Hence, control member 48 cannot have a telescoped placement on the flatted valve stem shank 16 in an angular and axial orientation other than the proper one shown in FIG. 2, and still bring its arms 57, 58 to a plane for swinging engagement with bushing surfaces 55 and 56.

As also appears in FIGS. 1 and 2, an annular rib 64 is integrally molded on the end of the bushing member 19, being of less height than but integrally connected with the extension 47; and a sealing O-ring 65 surrounds the stem shank 16 within the rib formation 64. The O-ring is placed under compression by an inner boss extension 66 of the control element 48.

Reference now being had to FIGS. 2, 3 and 5 in conjunction with FIG. 1, the bushing member 19 is molded adjacent the outer end thereof to afford a pair of diametrically opposed, radially extending locating ears or lugs 68, 69 which are received in correspondingly shaped and spaced notches or recesses 70 in the annular wall portion 12 of the valve body 11, axially outwardly of the latter's threading at 45.

Referring to FIG. 4, the valve member 18 is shown in its closed position in relation to the inlet ports 21 and 22 in which the rubber seals 27 sealingly engage the valve member 18. As the valve stem is rotated in a clockwise direction the passage 33 in the valve member is first brought into registry with the cold water inlet port 21. Upon continued rotation the leading edge of the hot water passage 34 in the valve member 18 is brought into registry with the hot water inlet port 22 and the valve then continues to be moved through the mixing range until finally the cold water inlet port 21 is closed off and the wider portion of passage 34 is in registry with the port 22 which is the full hot position of the valve, and which position may be adjusted by adjustment of the set screw 59. This sequence of operations from closed to cold and then through the mixing range to full hot is of course conventional. However, it will be noted from FIG. 4 that if a similar valve were to be installed on the opposite side of a wall containing the supply pipes without any additional piping to compensate for the reversal, the inlet port 21 in the valve body would be connected to the hot water line. Therefore, in such installations it is merely necessary to turn the bushing member 19 180°, which is made possible by the diametrically opposed lugs 68 and 69 and the recesses 70 in the valve body, the effect of which is to rotate the valve member 18 180° relative to the inlet ports 21 and 22, which will insure that the intended sequence of operations will occur with the same clockwise direction of opening movement of the valve.

What we claim as our invention is:

1. A mixing valve comprising a valve body having a bore therein and hot and cold water inlet ports opening into the inner end wall of said bore, a bushing in the outer end of said bore and spaced from said end wall to define a mixing chamber therebetween, a valve disc having an operating stem extending outwardly through and rotatably supported in said bushing, said valve disc being rotatable against said end wall and having circumferentially spaced hot and cold water passages extending therethrough respectively registrable with said hot and cold water inlet ports to permit the flow of water into said mixing chamber, stop means on said bushing and said stem to limit rotation of said valve disc between two limit positions, in one of which positions said valve disc closes both of said inlet ports and upon rotation thereof toward the other position first opens said cold water inlet port and then said hot water inlet port.

2. A mixing valve according to claim 1 wherein said valve body is provided with an outlet port opening into said end wall of said bore and said valve disc has portions of its periphery of smaller diameter than said bore to provide communication between said mixing chamber and outlet port in all positions of said valve disc.

3. A mixing valve according to claim 1 wherein said stop means comprises circumferentially spaced abutments on said bushing and a stop member rotatable with said stem and engageable with said abutments.

4. A mixing valve according to claim 3 wherein said stop member is provided with a pair of radially extending arms engageable with said abutments on said bushing.

5. A mixing valve according to claim 4 wherein one of said arms is provided with adjustable means engageable with the one of said abutments which defines the full hot position of said valve disc thereby to permit adjustment of said full hot position.

6. A mixing valve according to claim 1 wherein said other position of said valve disc defines the full hot position thereof, said stop means including a manually adjustable element to permit adjustment of said full hot position.

7. A mixing valve comprising a valve body having a bore therein and diametrically opposed hot and cold water inlet ports and an outlet port opening into the inner end wall of said bore, a bushing in the outer end of said bore and spaced from said end wall to define a mixing chamber therebetween, said mixing chamber communicating with said outlet port, a valve disc having an operating stem extending outwardly through and rotatably supported in said bushing, said valve disc being rotatable against said end wall and having circumferentially spaced hot and cold water passages extending therethrough respectively registrable with said hot and cold water inlet ports to permit the flow of water into said mixing chamber, stop means on said bushing and a stop member on said stem engageable therewith to limit rotation of said valve disc between two limit positions, in one of which positions said valve disc closes both of said inlet ports and upon rotation thereof toward the other limit position first opens said cold water inlet port and then said hot water inlet port.

8. A mixing valve according to claim 7 wherein said bushing and said valve body are provided with cooperating means for mounting said bushing in said valve bore in a selected position relative to said inlet ports.

9. A mixing valve according to claim 8 wherein said cooperating means permit selective mounting of said bushing in either of two diametrically opposite positions in said valve bore.

10. A mixing valve according to claim 8 wherein said cooperating means permit mounting of said bushing in either of two positions relative to said inlet ports whereby movement of said valve disc from its closed position will first open a selected one of said inlet ports.

* * * * *